Figure 1:
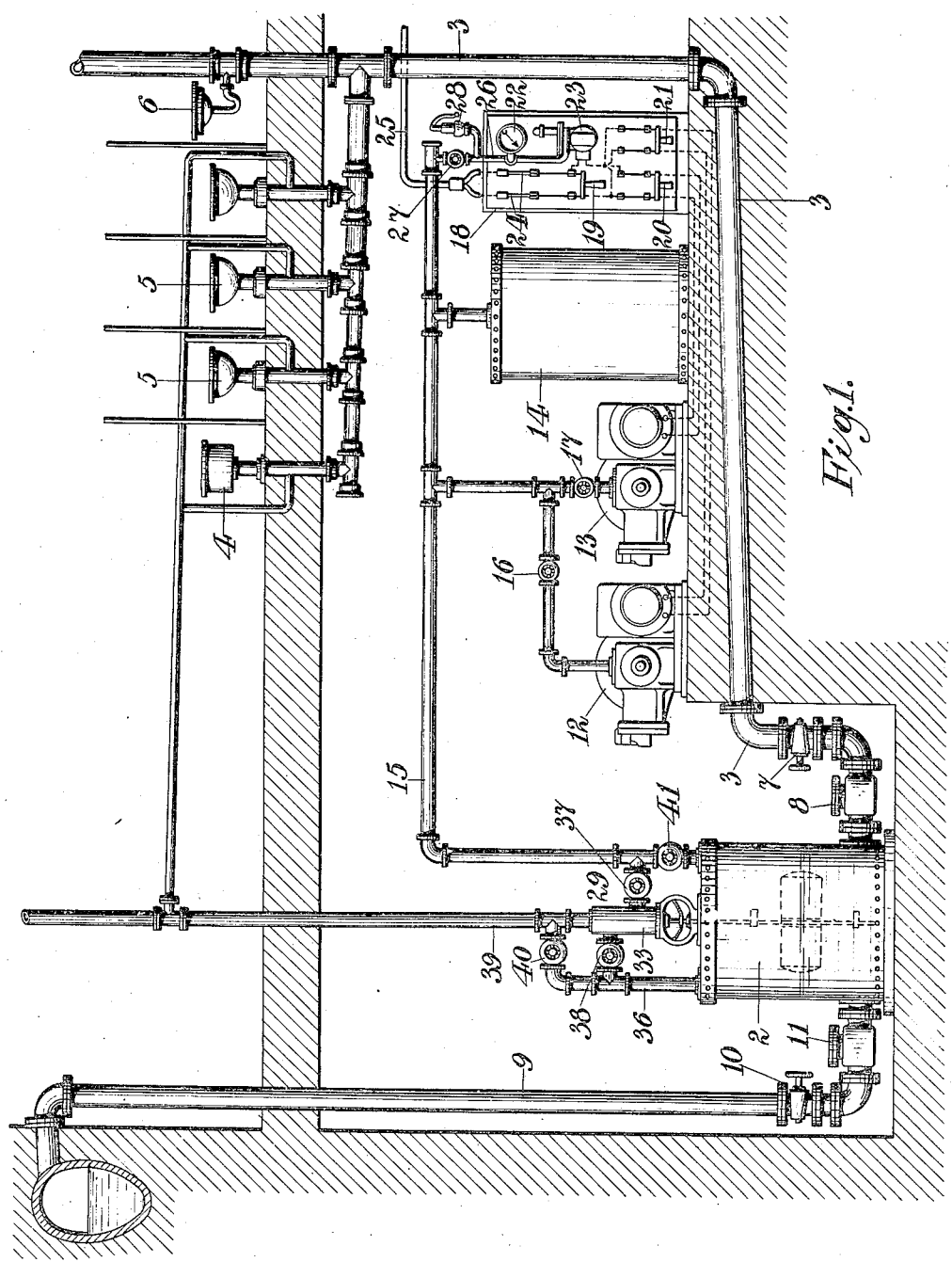

No. 863,360.  
PATENTED AUG. 13, 1907.  
J. W. COONEY.  
SEWAGE EJECTING SYSTEM.  
APPLICATION FILED OCT. 29, 1906.

3 SHEETS—SHEET 1.

Witnesses  
Bernard Cowen  
Wm. A. Kelly

Inventor  
John W. Cooney  
By his Attorney  
Henry D. Williams

No. 863,360.

PATENTED AUG. 13, 1907.

J. W. COONEY.
SEWAGE EJECTING SYSTEM.
APPLICATION FILED OCT. 29, 1906.

3 SHEETS—SHEET 2.

Witnesses

Inventor
John W. Cooney
By his Attorney
Henry D. Williams

No. 863,360.
PATENTED AUG. 13, 1907.
J. W. COONEY.
SEWAGE EJECTING SYSTEM.
APPLICATION FILED OCT. 29, 1906.
3 SHEETS—SHEET 3.
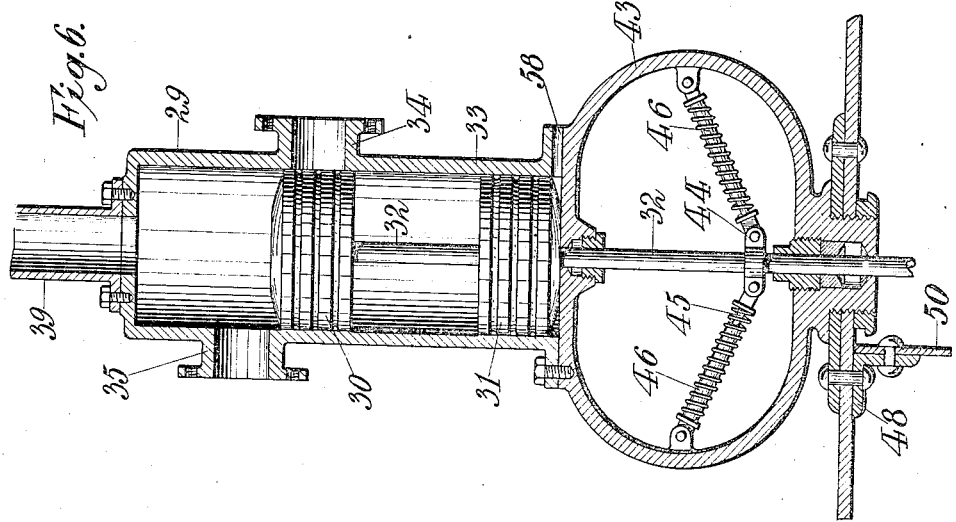
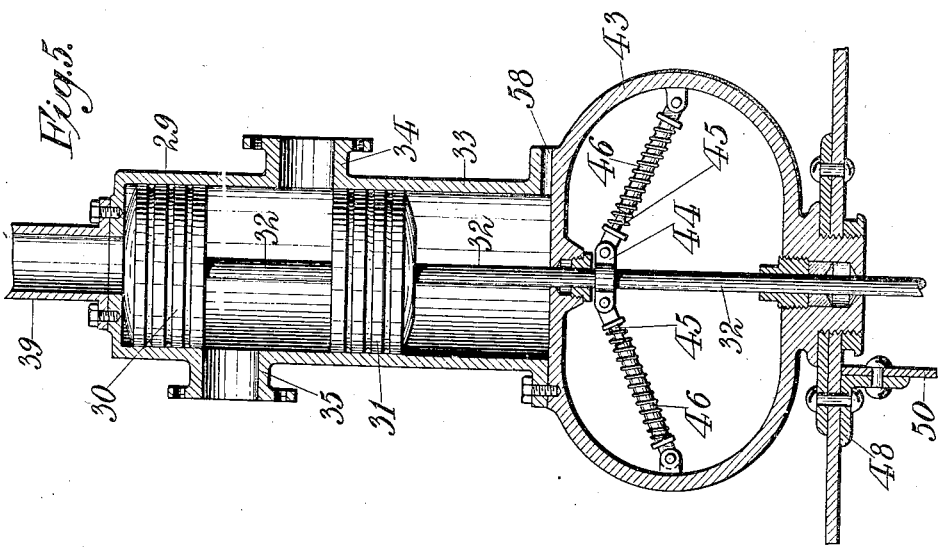
Witnesses
Inventor
John W. Cooney
By his Attorney
Henry D. Williams

UNITED STATES PATENT OFFICE.

JOHN W. COONEY, OF NEW YORK, N. Y.

SEWAGE-EJECTING SYSTEM.

No. 863,360.　　　Specification of Letters Patent.　　　Patented Aug. 13, 1907.

Application filed October 29, 1906. Serial No. 340,968.

*To all whom it may concern:*

Be it known that I, JOHN W. COONEY, a citizen of the United States, residing in the borough of Manhattan, city of New York, in the county of New York and State of New York, have invented certain new and useful Improvements in Sewage-Ejecting Systems, of which the following is a specification, reference being had therein to the accompanying drawings, forming a part thereof.

My invention relates to a system and apparatus for transferring liquids from places where liquids accumulate and from which they must be removed. For instance, my invention is applicable to the purpose of ejecting sewage from a receiving tank or reservoir into a sewer in cases wherein the receiving tank is located below the sewer level, and to the purpose of ejecting the sewage accumulated in a receiving tank located on board ship below the water level, and to the purpose of ejecting bilge water from ships, and to other similar purposes.

The objects of my invention, broadly stated, are reliability and economy of operation, economy and simplicity of maintenance, and simplicity and economy of construction.

My invention comprises various features, all of which will appear clearly in the light of the following description of that particular embodiment of my invention which I have illustrated in the accompanying drawings; and I will at this point make general mention of several of such features.

My invention comprises a tank provided with a suitable discharge conduit or outlet and arranged to receive the sewage or other liquid which is to be transferred or ejected, a float arranged to rise and fall with the level of the liquid in the tank, a source of compressed gas arranged to communicate with the receiving tank so as to expel or eject the liquid therefrom, a valve in control of such communication between the source of compressed gas and the receiving tank, and an energy-storing valve-shifting spring or equivalent device arranged to be compressed by movement of the float or otherwise to receive valve-shifting energy from such float movement and arranged to deliver such energy to the valve in a valve-shifting movement so that, after the valve-shifting device has been set by movement of the float, it can operate the valve positively and quickly and without dependence upon any further movement of the float; and my invention also broadly comprehends a float and valve-shifting energy-storing device and valve such as above defined, arranged to control communication between the receiving tank and the outer air. My invention also broadly comprehends such a float and energy-storing valve-shifting device and valve arranged to control both communications above mentioned, to wit, communication between the receiving tank and a source of compressed air and communication between such tank and the outer air.

As one embodiment of the energy-storing valve-shifting device above mentioned, my invention broadly comprehends an extensible or telescoping valve-shifting spring rod pivotally anchored at one end and at the other end pivotally connected with the valve and having a compression spring mounted thereon and arranged to be compressed by shortening of the spring rod, the valve in this instance being moved by the float so as to shorten the spring rod and compress the spring so that, after the spring has been thus compressed, it will further shift the valve quickly and positively and without dependence on any further movement of the float.

Further, the illustrated embodiment of my invention comprises two telescoping spring rods such as above described, arranged opposite each other so as to co-act efficiently in receiving energy from the float and delivering valve-shifting energy to the valve.

I will now describe the illustrated embodiment of my invention and will thereafter point out in claims the broad and specific features thereof.

The drawings illustrate the adaptation of my invention to the purpose of ejecting sewage from a receiving tank arranged to receive the sewage from a building and located considerably below the level of the street sewer.

Figure 2:
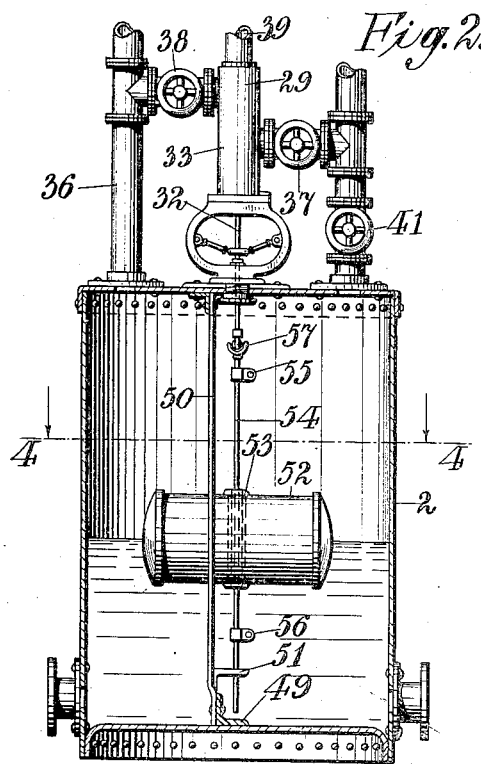
Figure 3:
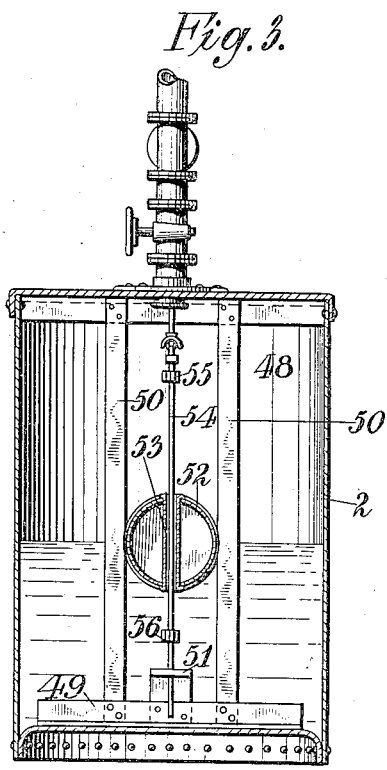
Figure 4:
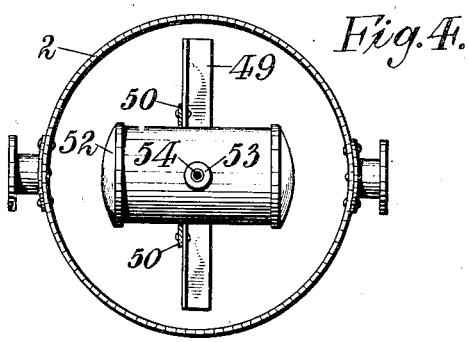

In the accompanying drawings—Figure 1 is a general elevation of the entire system and apparatus. Fig. 2 is an elevation of the receiving tank, the ejection controlling valve and piping mounted on the tank, and the valve controlling float contained within the tank, the tank itself being shown in midsection and the view point being the same as in Fig. 1. Fig. 3 is a midsectional elevation of the receiving tank from a view point to the right of Fig. 2 and shows the piping mounted on the tank and also shows the float in transverse midsection. Fig. 4 is a sectional plan view of the tank and valve controlling float, the plane of section being indicated by the line 4—4, of Fig. 2. Figs. 5 and 6 are enlarged midsectional elevations of the ejection-controlling valve, the view point being the same as in Figs. 1 and 2 and the valve of Fig. 5 being shown in position to effect ejection of sewage from the receiving tank, while the valve in Fig. 6 is shown in normal position permitting sewage liquid to accumulate in the receiving tank.

The receiving tank 2 is located in the subcellar of a building and receives sewage water from a drain pipe 3, into which are emptied sinks such as 4, water closets such as 5, and wash basins such as 6. The drain pipe discharges into the bottom of the receiving tank at one side thereof and through an inlet gate valve 7 and also through an inlet check valve 8 interposed qetween such gate valve and the tank. A discharge pipe 9 leads from the bottom of the receiving tank at a point opposite the inlet from the drain pipe 3, and extends upward to a point of connection with the street sewer. An outlet gate valve 10 is interposed in the discharge pipe 9 near the receiving tank, and an outlet check valve 11 is connected in such discharge pipe between such gate valve and the tank.

The sewage water is ejected from the receiving tank by compressed air and I have provided two electric motor air-compressors 12 and 13 for supplying compressed air to the air tank 14. These compressors are connected to the main air pipe 15 through suitable globe valves 16 and 17, by means of which either compressor may be shut off from the main air pipe, leaving the other compressor to do the work. The main air pipe communicates directly with the air tank 14 and conveys air to such tank from the compressors, and from such tank to the sewage receiving tank 2. On the switch board 18 are mounted the fuses 24 and the switches 19, 20 and 21, which control the electric motors of the compressors 12 and 13; and on such switch board are also mounted a pressure gage 22 indicating the pressure in the air tank 14 and main air pipe 15, and a pressure-controlled circuit-breaker 23 arranged to break the power circuit leading to both electric motors when the pressure in the air tank and main air pipe attains a predetermined limit. The electric power circuit 25 leads into the switch board and thence passes through the fuses 24 to the main switch 19. Thence one side of the circuit leads directly to one terminal of each of the individual motor-controlling switches 20 and 21, while the opposite side of the power circuit leads from the switch 19 through the pressure-controlled circuit-breaker 23 and thence to an opposite terminal of each of the individual motor-controlling switches. The motor-controlling switch 20 is interposed in that branch of the power circuit which feeds the electric motor of the compressor 13, while the motor-controlling switch 21 is interposed in that branch of the power circuit which feeds the electric motor of the compressor 12. A small switch-board pipe 26, mounted on the switch board, is connected with the main air pipe 15 through a hand-controlled cut-off valve 27. The switch-board pressure gage 22 and the pressure-controlled circuit-breaker 23 are directly connected with the switch-board pipe 26, and a blow-off or puppet valve 28 is also connected with such switch-board pipe 26 and adjusted to blow off at a given pressure to insure against bursting of the air tank 14 or other damage incident to rise of pressure in the event of failure on the part of the automatic pressure-controlled circuit-breaker 23 to stop either or both of the electric compressors when a predetermined pressure has been attained in the air tank and main air pipe. The foregoing organization of air tank, compressors and switch-board apparatus operates to maintain a supply of compressed air within the tank.

We may now consider the construction of the ejection-controlling valve designated generally by the reference character 29. The valve proper comprises upper and lower valve pistons 30 and 31 respectively, mounted on a common valve stem 32 and reciprocating in a cylindrical valve chamber 33 provided with connection lugs 34 and 35 bored to form valve ports and communicating respectively with the main air pipe 15 and with the sewage tank service air pipe 36 which leads directly into the top of the sewage tank 2. Hand-operated cut-off valves 37 and 38 are interposed respectively between the valve-connection lug 34 and the main air pipe 15 and between the valve-connection lug 35 and the sewage tank service air pipe 36. These hand valves are normally open. The upper end of the cylindrical valve chamber 33 is directly connected with a vent pipe 39 leading to the outer air. A normally closed hand-operated cut-off valve 40, when opened, connects the sewage tank service air pipe 36 with this vent pipe 39. A normally closed hand-operated cut-off valve 41, when opened, connects the main air pipe 15 directly with the top of the sewage receiving tank 2.

The normally closed cut-off valves 40 and 41 are designed to operate the sewage ejecting apparatus by hand when, for the purpose of repair or inspection, it is necessary to remove the ejection-controlling valve which generally controls the operation of the apparatus automatically. In the event of such hand control, the normally open hand-operated valves 37 and 38 are closed as long as the automatic ejection-controlling valve is removed, and while sewage flows into the tank from the drain pipe 3 the hand valve 40 is opened to permit the air in the upper part of the tank to escape freely into the vent pipe 39 and the hand valve 41 is closed to prevent the escape of compressed air from the main air pipe 15. Then, after the tank has filled with sewage water, the hand valve 40 is closed to cut off communication between the sewage tank 2 and the vent pipe 39 and the hand valve 41 is opened, whereupon compressed air from the main air pipe 15 rushes into the upper end of the sewage tank 2 and forcibly ejects the sewage water through the outlet check valve 11, gate valve 10 and discharge pipe 9 into the street sewer, it being understood that the inlet check valve 8, of course, prevents the sewage from flowing back into the drain pipe 3 when the compressed air is admitted into the sewage tank. After the tank has thus been emptied, the hand valve 41 is closed and the hand valve 40 is again opened to permit escape of air from the sewage tank 2 and thus permit the tank to receive sewage water from the drain pipe 3. The inlet and outlet gate valves 7 and 10 are provided to close the ends of the drain pipe 3 and discharge pipe 9 when it is desired to remove the inlet and outlet check valves 8 and 11.

The cylindrical valve chamber 33 is mounted on an open frame casting 43 provided at its lower end with an integral stuffing box inserted, as indicated, into the top of the sewage tank 2. The valve stem 32 passes down between the diametrically opposite legs of the open frame 43 and through the stuffing box and into the upper end of the sewage receiving tank. The lower and upper valve ports formed respectively in the valve lugs 34 and 35, and the valve pistons 31 and 30, are so positioned that when the valve is in its lower or normal position indicated in Fig. 6, the lower port in the lug 34 is closed and the upper port in the lug 35 is in open communication with the vent pipe 39 leading into the upper end of the cylindrical valve chamber, while the valve in its uppermost position, indicated in Fig. 5, closes such communication between the upper valve port and vent pipe and opens communication between such upper valve port and the lower valve port.

On that portion of the valve stem which passes through the open frame 43 is mounted a valve stem collar 44 provided with diametrically opposite lugs pivotally connected with the inner ends of spring rods 45 which are slidably fitted into spring sleeves 46 pivoted at their outer ends to lugs formed on the inner sides of the opposite legs of the frame 43. The inner ends of the rods 45 and the outer ends of the sleeves 46 are provided with spring collars and a compression spring is coiled over each spring sleeve 46 and interposed between the spring collar of such sleeve and the spring collar of its coöperating rod 45. Thus the rods and sleeves 45 and 46 form telescoping or extensible spring rods which are constantly subjected to the expansive efforts of their respective springs. The valve stem collar 44 is so positioned that when the valve is in a given position between its two extremes of movement, the spring rods will be horizontal and shortened to their minimum length and their projected axes will be coincident so that they will exert no longitudinal thrust upon the valve stem. This position of the spring rods may be designated the neutral position, and when the valve stem is above this position it will be subjected to an upward thrust from the spring rods, and when the valve is below such neutral position it will be subjected to a downward thrust from the spring rods, all by virtue of the composition of concurrent forces well known in physics.

The top and bottom of the sewage receiving reservoir are stiffened by transverse angle irons 48 and 49, respectively, and stayed by two vertical iron strips 50 riveted at their ends to such top and bottom stiffening angles 48 and 49. A hollow cylindrical float 52 floats between the vertical stays 50 upon the sewage liquid in the sewage tank and, of course, rises and falls with the liquid in the tank. A vertical float rod 54 passes freely through a middle diametric bushing 53 fixed in the hollow cylindrical float. The float rod 54 is guided at its lower end in a bracket 51 mounted on the bottom stiffening angle iron 49, and the upper end of the float rod is connected with the lower end of the valve stem 32 by a universal joint 57. The float rod 54, together with the stays 50, guide the float in its rising and falling movement. The float rod 54 carries upper and lower striking collars 55 and 56 respectively, which are engaged by the upper and lower ends of the bushing 53 as the float is carried by the rise and fall of liquid to its uppermost and lowermost positions.

While the sewage receiving tank 2 is being filled from the drain pipe 3, the ejection-controlling valve and its valve stem 32 are in lowermost positions indicated in Figs. 1, 2, and 6. As the sewage accumulates in the tank 2, the float rises with the sewage level and until the upper end of the guide bushing 53 comes into contact with the upper striking collar 55 on the float rod 54. Thereafter further rise of liquid causes the float to raise the upper striking collar 55 and thus raise the float rod 54 and the valve stem 32 until the spring rods have reached the neutral position. At this instant the upper end of the upper valve piston 30 is just above the upper valve port, while the lower end of such upper piston is just below such upper valve port, so that the upper valve port is effectually closed. At this instant the lower valve port is also effectually closed because it communicates only with the space between the two valve pistons and because such space is not at the moment in communication with the upper valve port. Now, any further rise of liquid in the sewage receiving tank will cause the float to raise the valve stem 32 with its telescoping spring rods above their neutral position, whereupon the spring rods will immediately throw the valve quickly and forcibly to its extreme upward position where the upper valve piston 30 abuts against the upper end of the cylindrical valve chamber. In this uppermost position of the valve, both its upper and lower ports communicate with the space between the upper and lower valve pistons and hence communicate with each other so that compressed air immediately flows from the main air pipe 15 through the normally open hand valve 37, lower valve port, space between the upper and lower valve pistons, upper valve port, normally open hand valve 38, and the sewage tank service air pipe 36 into the upper end of the sewage tank. The compressed air thus admitted to the upper end of the sewage tank quickly expels the sewage liquid from the tank by way of the outlet check valve 11, outlet gate valve 10 and discharge pipe 9; and as the liquid level in the tank falls, the float, of course, falls with it until the lower end of the float guiding bushing 53 engages the lower striking collar 56 on the float rod 54, so that further fall of liquid will result in carrying the float rod and valve stem downward until the telescoping spring rods connected with the valve stem are again in neutral position. As the float is falling and just before the telescoping spring rods are brought to neutral position the upper valve piston 30 closes the upper valve port and thus severs communication between the main air pipe 15 and the sewage tank service air pipe 36, but when this closure of the upper valve port occurs, the greater part of sewage has been expelled from the tank so that the tank contains a large quantity of compressed air which, by its expansion, continues the ejection of sewage and the falling movement of the float until, as before noted, the telescoping spring rods assume their neutral positions. And thereafter a very slight continuance of fall of liquid level and float results in carrying the spring rods below their neutral positions, whereupon they forcibly and quickly thrust the valve stem, piston valves, float rod, etc., to lowermost positions indicated in Fig. 6 so as to close the lower valve port and open the upper valve port to communication with the vent pipe 39 by way of the cylindrical valve chamber. Thereupon the compressed air escapes from the sewage receiving tank by way of the sewage tank service air pipe 36, normally open hand valve 38, upper valve port, cylindrical valve chamber, and vent pipe 39, and the tank is now in condition to be filled again from the drain pipe 3.

The universal joint 57 is provided to allow for inaccuracy in alinement of the valve stem 32 and the float rod bracket 51.

The functions of the telescoping spring rods and the importance of employing such telescoping spring rods, or some equivalent thereof, will be apparent from the foregoing description. By positively and quickly throwing the ejection-controlling valve to either of its extreme positions and without any considerable movement of the float beyond that required to bring the telescoping spring rods to neutral positions, this device effects that positiveness of control of the compressed air which is necessary to alternately eject the sewage with positiveness from the tank and permit such sewage to flow freely into the tank.

It will be apparent that my invention and various distinctive features thereof may be embodied in various constructions and arrangements specifically different from the illustrated embodiment of my invention but coming fully within the scope, principles and spirit thereof.

What I claim is:—

A system for transferring liquids comprising a tank arranged to receive the liquid and provided with a suitable outlet, a float arranged to rise and fall with the liquid in the tank, a ventway affording communication between the tank and the outer air, a source of compressed gas in communication with the tank, a vertically-movable piston valve in control of both such communications, a valve rod connected with the valve and entering the top of the tank, connections between the valve rod and the float whereby the rod and valve are raised and lowered by the movements of the float, and spring-actuated valve-shifting mechanism connected with the valve rod and operating to open and close the valve quickly during the latter portions of the vertical movements of the valve rod.

In testimony whereof I have affixed my signature in presence of two witnesses.

JOHN W. COONEY.

Witnesses:
WM. A. KELLY,
BERNARD COWEN.